US007389682B2

(12) United States Patent
JaVaherian

(10) Patent No.: US 7,389,682 B2
(45) Date of Patent: Jun. 24, 2008

(54) METHOD AND APPARATUS FOR ENGINE TORQUE SENSING

(75) Inventor: Hossein JaVaherian, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 107 days.

(21) Appl. No.: 11/378,725

(22) Filed: Mar. 17, 2006

(65) Prior Publication Data

US 2007/0220960 A1 Sep. 27, 2007

(51) Int. Cl.
*G01M 15/00* (2006.01)
(52) U.S. Cl. .................. 73/117.2; 73/116; 73/118.1; 73/862.041
(58) Field of Classification Search .......... 73/116, 73/117.2, 117.3, 118.1, 862.041–862.044
See application file for complete search history.

(56) References Cited

U.S. PATENT DOCUMENTS

| 5,485,757 | A | * | 1/1996 | Foxwell ............... 73/862.321 |
| 6,269,702 | B1 | | 8/2001 | Lambson ............. 73/862.045 |
| 6,314,342 | B1 | * | 11/2001 | Kramer et al. ............... 701/1 |
| 6,408,625 | B1 | * | 6/2002 | Woon et al. ............... 60/608 |
| 6,621,278 | B2 | | 9/2003 | Ariav |
| 6,765,493 | B2 | | 7/2004 | Lonsdale et al. |
| 6,966,868 | B2 | * | 11/2005 | Stork et al. ............... 477/74 |
| 7,095,198 | B1 | | 8/2006 | O'Brien ............... 318/432 |
| 7,111,611 | B1 | * | 9/2006 | Lyon ............... 123/399 |
| 7,201,044 | B1 | * | 4/2007 | Bunyer et al. ............... 73/117.3 |
| 2001/0025486 | A1 | * | 10/2001 | Ogiso et al. ............... 60/285 |
| 2002/0195873 | A1 | * | 12/2002 | Fawkes et al. ............... 303/139 |
| 2003/0143957 | A1 | * | 7/2003 | Lyon ............... 455/67.1 |
| 2005/0210971 | A1 | * | 9/2005 | Saloh ............... 73/118.1 |
| 2007/0068235 | A1 | * | 3/2007 | Bunyer et al. ............... 73/116 |

FOREIGN PATENT DOCUMENTS

WO 2006/018607 2/2006

OTHER PUBLICATIONS

Larsson, S. et al., "An Experimental Evaluation of Torque Sensor-based Feedback Control of Combustion Phasing in an SI Engine," SAE 2005-01-0060, 2005.

J. R. Sobel, J. Jeremiasson, and C. Wallin. Instantaneous Crankshaft Torque Measurement in Cars. SAE Technical Paper Series 960040, 1996.

Larsson, Stefan; Andersson Ingemar; "An Experimental Evaluation of Torque Sensor Based Feedback Control of Combustion Phasing in an SI-Engine" SAE 2005-01-0060, Apr. 11-14, 2005/ 2005 SAE World Congress; pp. 1-9.

Sobel, Jarl R., Jeremiasson Jan; Wallin Christer, "Instataneous Crankshaft Torque Measurement in Cars" SAE 960040; Feb. 26-29, 1996; pp. 39-47.

(Continued)

*Primary Examiner*—Edward Lefkowitz
*Assistant Examiner*—Freddie Kirkland, III

(57) ABSTRACT

An engine torque sensory system (10), adapted for use with an engine-driven vehicle (12) having a flexplate (18), including at least one sensor (26) fixedly attached on the surface of the flexplate (18) and operable to detect deformations along the surface of the flexplate (18) caused by the generated engine torque, and further including a receiver (28) communicatively coupled to the sensor (26), spaced from the rotating flexplate (18), and operable to convert sensor readings to correlative engine torque values.

18 Claims, 8 Drawing Sheets

OTHER PUBLICATIONS

Kalinin, V.; "Modelling of a Wireless SAW System for Mutiple Parameter Measurement"., IEEE Ultrasonics Symposium, Oct. 7-10, 2001; pages (4).

Beckley, J., Kalinin V., Lee, M,; Voliansky, K.; "Non-Contact Torque Sensors Based on SAW Resonators", IEEE Frequency Control Symposium, May 29-31, 2002, pages (12).

Kalinin, Victor; Bown, George; Beckley, John; Lohr Raymond;, "Pulsed Interrogation of the SAW Torque Sensor for Electrical Power Assisted Steering"; IEEE Ultrasonics Symposium, Aug. 24-27, 2004, pages (4).

\* cited by examiner

METHOD AND APPARATUS FOR ENGINE TORQUE SENSING

TECHNICAL FIELD

The present invention relates to engine torque sensors, and more particularly, to a direct engine torque measurement system using flexplate deformations under torsional load application, wherein said system includes a flexplate-mounted sensor.

BACKGROUND OF THE INVENTION

Engine torque sensors have been developed to help regulate and optimize various aspects of motor-driven vehicular performance. For example, to improve automotive vehicle driveability in powertrain applications, it is desirable to coordinate engine and transmission control functions. Transmission control algorithms in powertrains use torque information from the engine controller under a wide variety of powertrain operating conditions to improve shift quality, fuel economy, and drivability. Engine torque sensing is used to improve other aspects of performance, such as cold-start driveability, combustion optimization, and cylinder-balancing.

For internal combustion engines, in-cylinder pressure sensors have traditionally been utilized to estimate engine torque as a function of the pressure gradient during compression and power strokes. Other more complex modules have also been developed to estimate engine torque utilizing various combinations of sensors. For example, the in-cylinder pressure sensor may be combined with manifold pressure, air-flow, ambient pressure, and air temperature sensors to generate a cooperative engine torque estimation system. The limited accuracy and reliability of these estimation modules, however, present fidelity concerns that impede high performance engine and transmission control strategies currently prevalent in automotive vehicles. As subsystems, including those related to emissions, fuel economy and driveability, become increasingly more complex, their proper performance require more accurate torque determination, making conventional engine torque estimation methods insufficient to achieve the stated goals of new powertrain control strategies.

To achieve the objectives of faster and more efficient powertrain calibration, control, engine-transmission matching and improved driveability, direct engine torque sensors of laboratory quality have been developed in recent years. These sensory systems typically include a crankshaft-mounted sensor that directly measures the torque-induced strains in the crankshaft. For example, conventional crankshaft-mounted strain gauges have been electronically coupled to a communication bus through a series of slip-rings, insulators, and brushes. Another example includes a magnetoelastic application, wherein the crankshaft is elongated, and at least a portion of the crankshaft is initially magnetized. In this configuration, a collar sensor measures changes in the magnetic flux of the magnetostrictive material.

Conventional direct engine torque sensors, however, present various packaging, cost, performance, and reliability concerns. First, these sensors are relatively complex and expensive to produce in comparison to other vehicle components, and therefore, have yet to become fully implemented in the mass production of automotive vehicles. Another obstacle to mass production is the lack of required space on or near the crankshaft for sensor integration in production vehicles. No earlier attempts at installing the sensor on the crankshaft have led to a method viable for mass production, as they require significant engine modifications. Finally, the limited bandwidth typically presented in these sensors provide insufficient capabilities for optimization tasks, such as shift point optimization or spark timing control on an individual-cylinder individual-event basis for the full range of engine operating conditions.

SUMMARY OF THE INVENTION

Responsive to these and other concerns presented by conventional engine torque estimation systems and crankshaft torque sensors, the present invention concerns an improved engine torque sensing technique that directly measures deformations on the surface of a disk, such as a flexplate or a flywheel transmitting engine torque to a vehicle gearbox (transmission system or torque converter). In direct contrast to conventional crankshaft-mounted sensors, measuring the torque through the flexplate significantly alleviates packaging concerns by utilizing the larger surface area provided by the disk. Among other things, this invention is useful for providing a faster and more accurate method of determining actual engine torque values, which in turn can be used to improve powertrain calibration, engine performance, transmission control, engine-transmission matching, chassis/vehicle control, and driveability. The relatively lower costs, ease of packaging, and minimal required modifications to the production configuration associated with the direct torque sensors of the present invention are expected to facilitate faster integration in automotive vehicles. Finally, the present invention is further useful for providing real-time feedback, and therefore, more efficient and accurate engine torque control under a closed-loop system.

The present invention general concerns an engine torque sensory system adapted for use with a vehicle having an engine and a flexplate (i.e. a disk), wherein the flexplate is coupled to, rotated by, and exhibits deformation caused by torque generated by, the engine. The system includes at least one deformation sensor directly attached to the flexplate, and a receiver fixedly attached to the vehicle, spaced from the flexplate, and communicatively coupled to the sensor. The sensor response is caused to change by and relative to the deformations exhibited in the flexplate. The sensor is configured to generate and transmit strain-related data to the receiver. Finally, the receiver is configured to receive the deformation-related data, and convert the data into correlative engine torque values. In a preferred embodiment of the invention, the sensor may include at least one strain gauge attached to the flexplate.

Another aspect of the present invention further includes the addition of a signal generator configured to deliver an impulsive radio frequency (RF) signal to the sensor. The sensor in this configuration includes a piezoelectric base attached to the flexplate, and an inter-digital transducer and array of metal strips attached to the base. The base, array, and transducer are caused to change by and correlative to the flexplate strain. The base, array, and transducer are cooperatively configured to receive, and modify the impulse signal, and reflect the modified signal to the receiver. Finally, the receiver is configured to determine an engine torque value based on the modified reflected signal. In a preferred embodiment of this invention, the modified signal properties may cause changes in the signal resonance frequency due to strain build-up.

Yet another aspect of the invention also includes a signal generator, and a sensor having at least one special measurement bar. The bar of a given length with at least one end attached to a piezoelectric pulse generator has a predetermined cross-sectional area and modulus of elasticity, so as to be correlatively expandable (or contractable) by the flexplate tensile (or compressive) strains. The sensor is configured to receive an impulse signal at one end of the bar, propagate the signal towards the other end, measure the elapsed time of pulse propagation, and generate and transmit to the receiver strain-related data based on the measured elapsed time. The receiver is configured to receive the strain-related data, and convert the data into correlative engine torque values. In a preferred embodiment of this aspect of the invention, the torque is correlated with the change in the elapsed time which represents the corresponding change in the length of the measurement bar.

Thus, it will be appreciated and understood that the system and modes of operation of the present invention provide a number of improvements and advantages over the prior art. The aforementioned aspects, features, and/or species of the present invention are discussed in greater detail in the section below titled DESCRIPTION OF THE PREFFERED EMBODMIENT(S).

BRIEF DESCRIPTION OF THE DRAWINGS

Preferred embodiments of the invention are described in detail below with reference to the attached drawing figures, wherein:

FIG. 1a is an elevation view of an automotive vehicle adaptable for use with the present invention;

DESCRIPTION OF THE PREFERRED EMBODIMENT(S)

Figure 1:
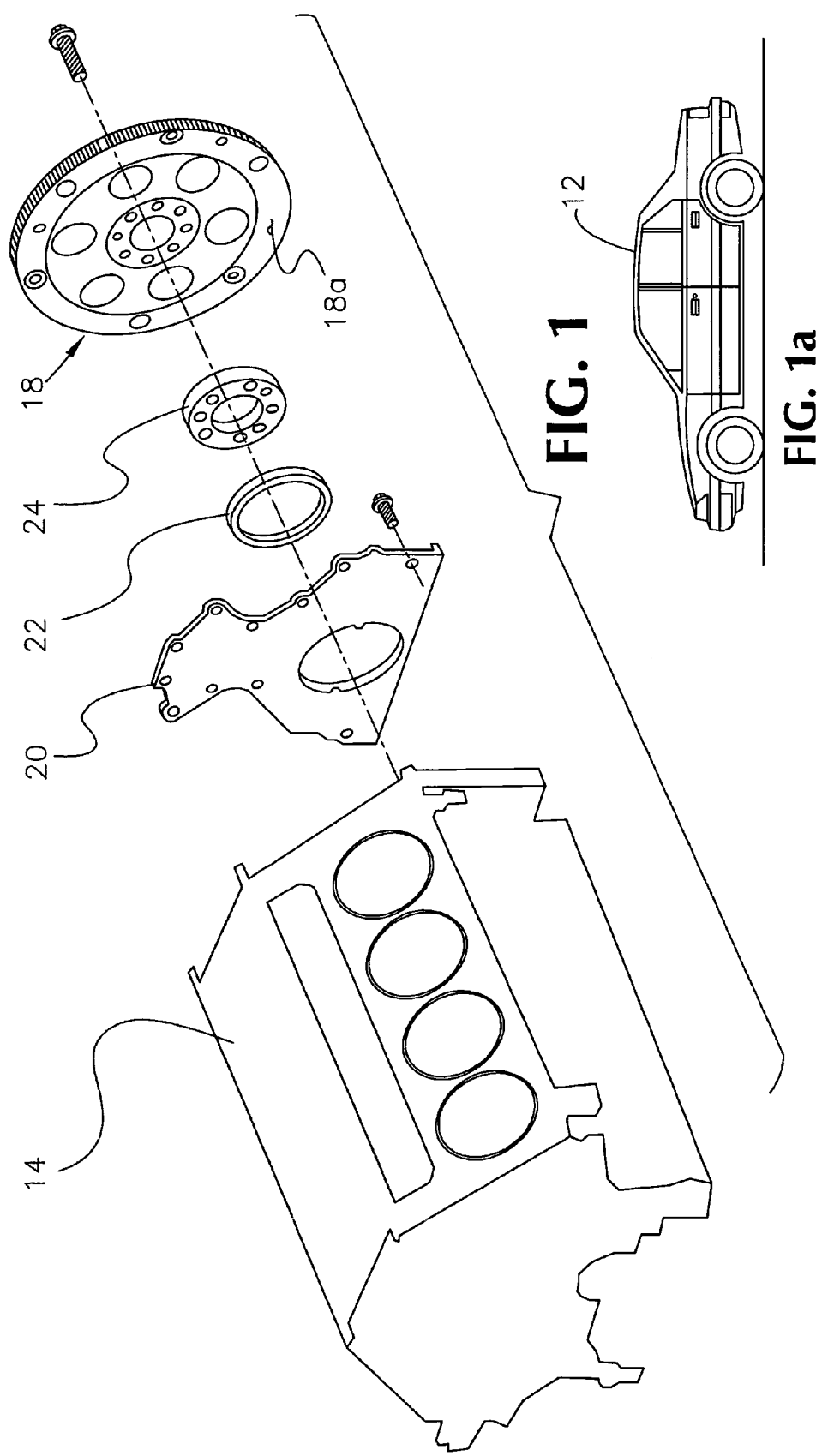
FIG. 1 is an exploded perspective view of a conventional engine and flexplate assembly.

The present invention concerns an improved direct engine torque sensory system 10 adapted for use by a vehicle 12 having an engine 14, a crankshaft 16 connected to the engine 14, and a flexplate 18 fixedly attached to the crankshaft 16. As is typical, the crankshaft 16 and engine 14 are cooperatively configured to convert the linear displacement of engine components (not shown) into the rotational displacement of the crankshaft 16 and flexplate 18. In FIG. 1, an exemplary conventional engine/flexplate assembly is shown, wherein the flexplate 18 is connected by a flexplate bolt to the rear of the engine block 14, and preceded sequentially by a crankshaft rear oil seal housing 20, a crankshaft rear oil seal 22, and a flexplate spacer 24.

Figure 2:
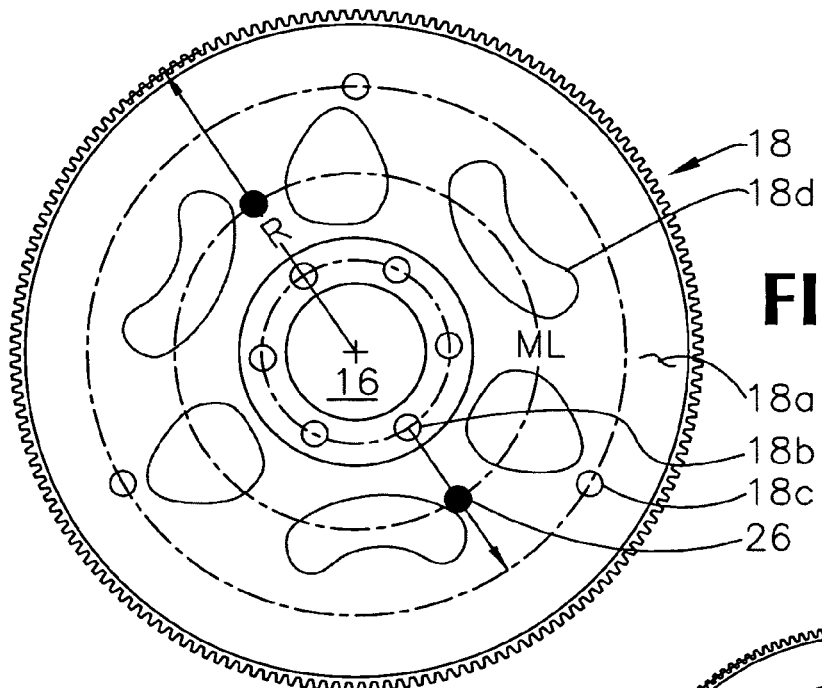
FIG. 2 is a profile view of a flexplate and plurality of flexplate-mounted sensors in accordance with a preferred embodiment of the present invention, particularly illustrating a plurality of two diametrically opposite sensors.
Figure 3:
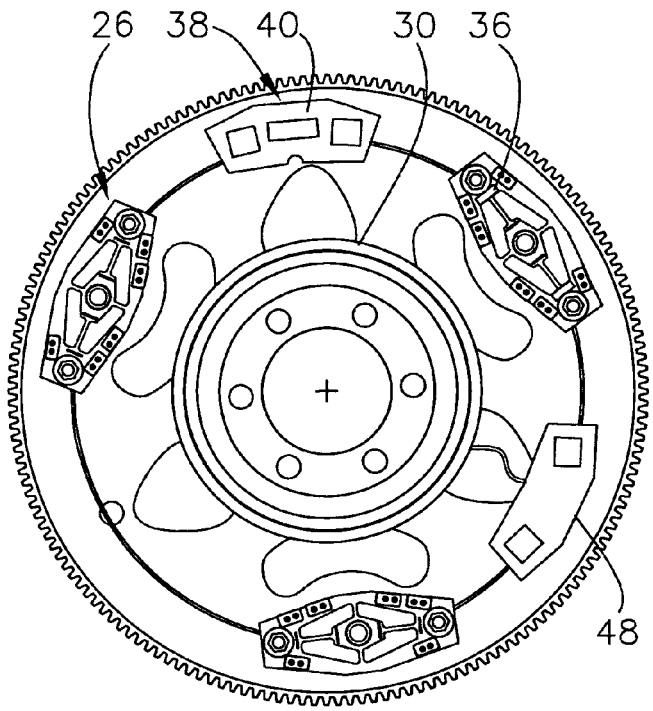
FIG. 3 is a profile view of a flexplate, plurality of sensors, a slip ring, a power supply board, and a communication board, in accordance with a first preferred embodiment of the present invention.
Figure 3A:
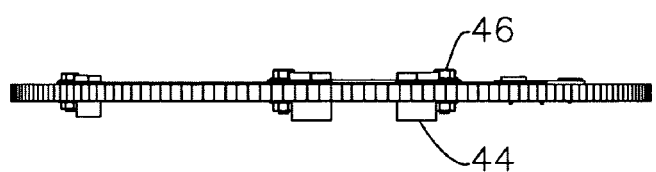
FIG. 3a is an elevation view of the assembly shown in FIG. 3.
Figure 3B:
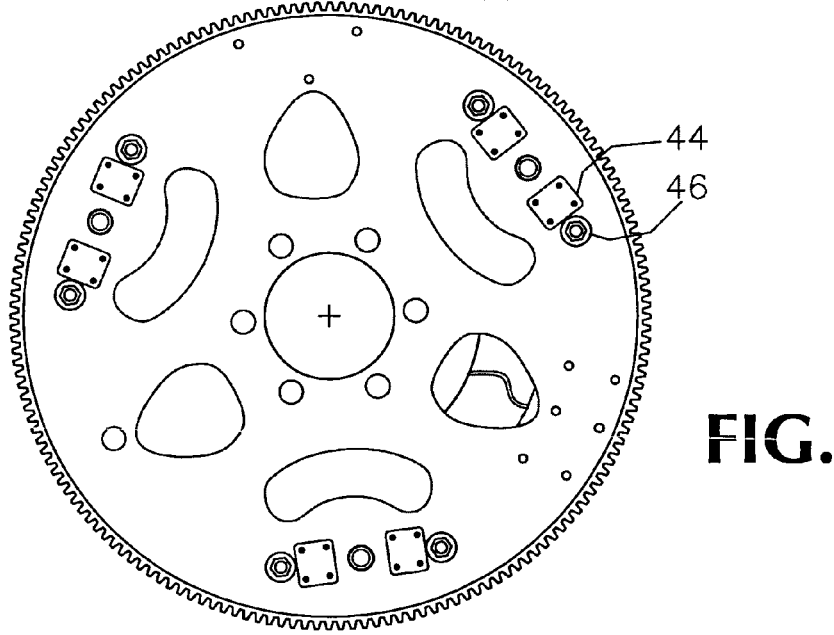
FIG. 3b is a back profile view of the assembly shown in FIG. 3.

The preferred flexplate 18 presents a disk with gearteeth on the rim, as is illustrated and conventionally used in the art (see, FIGS. 2 through 3b). For example, a suitable flexplate 18 having 168 teeth, and a 35.6 cm (14-inches) outside diameter may be utilized. It is appreciated that the flexplate 18 is peripherally configured to engage the starter motor (not shown) and drive the transmission system during engine cranking. The system 10 is preferably configured to function with a wide variety of conventional flexplates, so as to increase implementation and interchangeability within existing vehicle designs, and to facilitate after-market repair and replacement. Under normal operation, the flexplate 18 is further configured to transfer rotational energy to the gearbox or transmission (not shown) of the vehicle 12, and more preferably defines pluralities of crankshaft and gearbox engaging holes 18b and 18c, respectively. A plurality of cut-outs 18d is also typically defined by the flexplate to reduce weight and can be of any number and configuration. Thus, the engine 14 is rigidly coupled to the flexplate 18 at the center and the flexplate 18 is in turn coupled to the gearbox near the rim by a number of fasteners (not shown) so that the engine drives the gearbox through the flexplate 18.

The term "engine torque," as used herein, shall refer to the turning moment acting upon the crankshaft 16. The preferred embodiments of the system 10 are described with respect to an automotive vehicle 12 having an internal combustion engine 14, an automatic or manual transmission gear system (not shown) and a flexplate 18. However, it is appreciated and understood that the present invention can be adapted for beneficial use with any motor-driven vehicle having a disk-shaped element, such as a flexplate or flywheel, and as such, the term "flexplate" as used herein, shall include any disk-shaped element used to transfer engine torque within a powertrain, including conventional flexplates, and flywheels. For example, the present invention may be utilized with other types of propulsion systems, such as electric, fuel cell, hybrid, and diesel engines, and may be utilized with other vehicles, such as airplanes, and boats. It is further appreciated that two or more of the components described herein may be combined without deviating from the scope of the present invention.

In general, the system 10 functions to directly measure the engine torque by quantifying deformations (e.g. negative and positive strain) in the flexplate 18 caused thereby. In other words, any aspect of the flexplate strain field, such as changes in a circumferential reference length, stress and strain, or the speed of wave propagation is measured by the installation of a measuring device or sensor 26 to capture the related quantity of interest. It is appreciated by those ordinarily skilled in the art that the true strain exhibited by the flexplate 18 is directly proportional to the experienced stresses, the unit cross-sectional area, and the modulus of elasticity of the flexplate material, so that the preferred system 10 is specifically configured relative to the flexplate 18. The system 10 includes at least one, and more preferably, a plurality of sensors 26 that are each configured to detect deformations within the flexplate 18. It is also appreciated that the inventive aspect of mounting an engine torque sensor to a disk-shaped element, such as the flexplate, as opposed to other more cylindrical components such as the crankshaft, provides various advantages, including a larger surface area for engagement, a more responsive element to deformations (e.g. strain) caused by engine torque, and a more accessible engine torque system.

The sensor 26 is fixedly attached to the flexplate 18, and its output is configured so as to change by and relative to the flexplate strain. The sensor 26 is preferably attached to the engine-side face 18a of the flexplate, and may be welded, bolted and/or bonded to the flexplate 18 using a suitable high-temperature epoxy. The present invention broadly encompasses a variety of types of flexplate-mounted sensors 26, and may utilize one of a plurality of suitable technologies, such as an optical, piezoelectric, magnetoelastic, or a resistance based technology to measure the strain, displacement, stress or speed of wave propagation. For example, the sensor 26 may include at least one conventional strain gauge commonly used to measure strain, wherein the gauge presents a suitable gauge factor. More preferably, the strain gauge(s) is also thermally compensated to minimize the effect of temperature variations, given the wide range of temperatures anticipated to be experienced by the flexplate 18.

The sensor 26 is affixed to the flexplate 18 at a point suitable for the intended functions of the invention. As such, the preferred sensor location is substantially spaced from the flexplate periphery and center, since it is appreciated by those ordinarily skilled in the art that strain is relatively minimal at these locations. More preferably, assuming a homogenous flexplate 18, the sensor 26 is theoretically affixed at a point along the radial midline, ML, of the flexplate 18 under operation (see, FIG. 2). Where the flexplate 18 includes cut-outs 18d, as best shown in FIGS. 2 through 3b, the sensor 26 is preferably affixed along the circular line having the least cross-sectional area. Most preferably, a finite element stress analysis of the flexplate 18 under anticipated engine torque conditions is initially performed, and the sensor 26 is affixed at a predetermined optimal stress point of the flexplate 18.

Figure 2A:
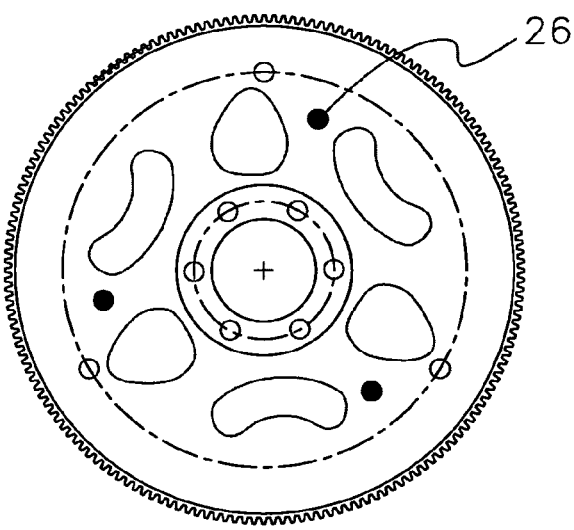
FIG. 2a is a profile view of a flexplate and plurality of flexplate-mounted sensors in accordance with a preferred embodiment of the present invention, particularly illustrating a plurality of three radially symmetric sensors.
Figure 2B:
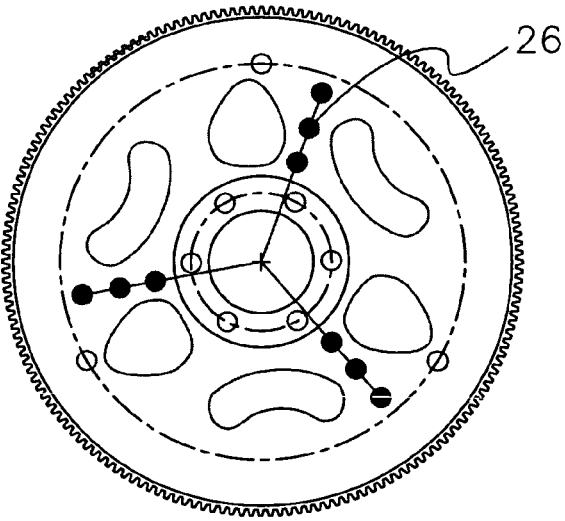
FIG. 2b is a profile view of a flexplate and plurality of flexplate-mounted sensors in accordance with a preferred embodiment of the present invention, particularly illustrating a plurality of radially symmetric and co-radially aligned sensors.

As previously mentioned, to reduce the likelihood of relying upon erroneous out-of-plane bendings, the preferred system 10 includes a plurality of individually functioning sensors 26 affixed to the flexplate 18, and is configured to cooperatively determine the flexplate strain as a function of the output from each sensor. For example, an average sensor output from a plurality of four sensors positioned in each quadrant may be calculated and further manipulated to cancel the effects of the out-of-plane bending and to determine the transmitted torque value. As shown in FIGS. 2 through 2b, sensors 26 are preferably positioned so as to present a radially symmetric configuration. For example, a plurality of two sensors are preferably diametrically opposed and equidistance from center, as shown in FIG. 2. Likewise, a plurality of three sensors are preferably affixed along radial lines 120 degrees apart, as shown in FIG. 2a. Most preferably, however, a greater plurality of sensors are radially symmetrically configured and co-radially aligned, as shown in FIG. 2b, to further insure achieving more accurate measurements. Lower bandwidth torque measurement is, however, possible when using even a single sensor.

Figure 5:
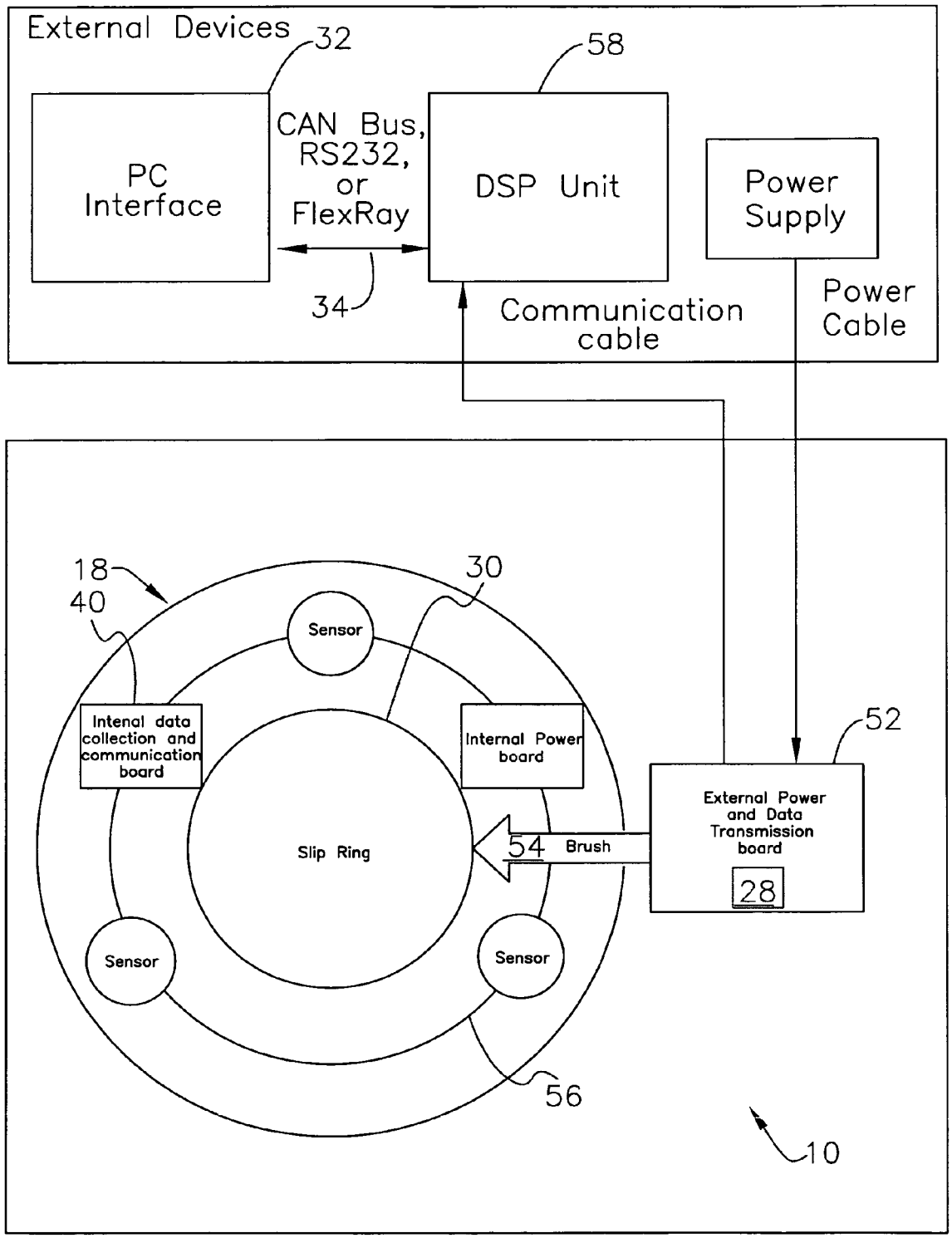
FIG. 5 is a schematic diagram of the assembly shown in FIG. 3, particularly showing an external power and data transmission board, and interconnection with external devices.
Figure 5A:
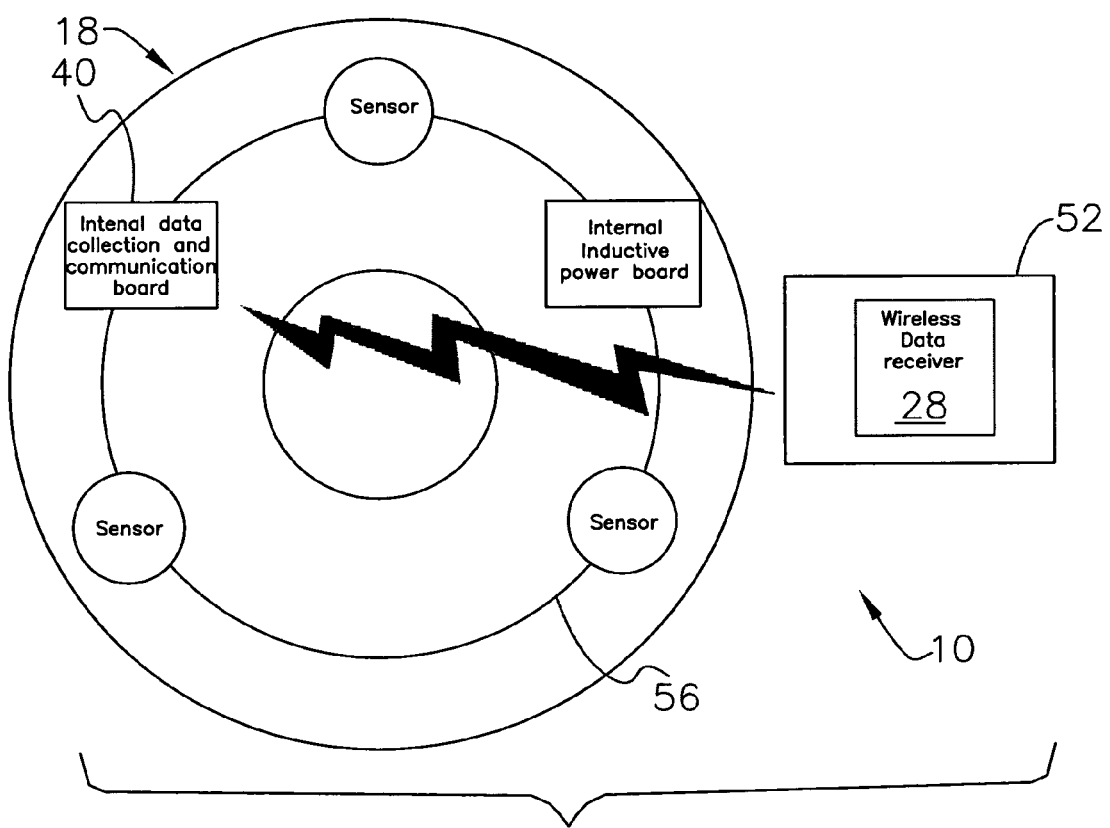
FIG. 5a is a schematic diagram of a portion of the assembly shown in FIG. 5, particularly showing wireless interconnection between the sensors/data transmission board and the receiver and external power supply board.
Figure 7:
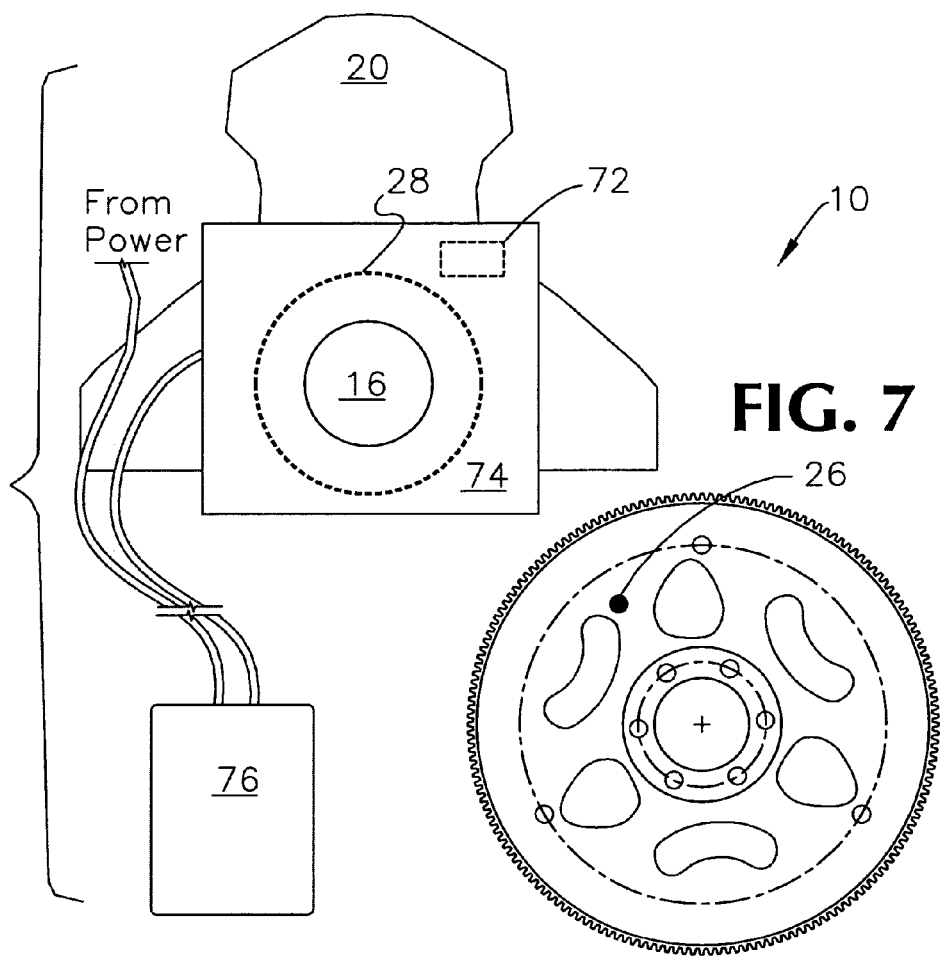
FIG. 7 is a schematic view of a flexplate, a SAW-based sensor, mounting bracket, and processor, in accordance with the second preferred embodiment of the present invention.

Each sensor 26 communicates with a central element, such as a receiver 28 (see FIGS. 5 and 7). The receiver 28 is fixed to a stationary part of the vehicle 12, spaced from the rotating flexplate 18, and communicatively coupled to the sensor 26. To minimize interference with other vehicle components and structures, and to minimize the required communication energy of the system 10, the receiver 28 is more preferably positioned proximate to the sensor 26. The data transmission to the receiver 28 may be configured through wireless connection (see FIG. 5a) or through a slip-ring mechanism 30 (see FIG. 5). Under either configuration, the receiver 28 is operable to receive relevant data from the sensor 26, and convert the data into correlative engine torque values.

The system 10 is preferably utilized in conjunction with an adjustable engine torque estimation module programmably executable by a PC or controller 32 (see FIG. 5), and suitable in-vehicle processing and communication means 34, so as to provide real-time feedback to the module, under a closed loop system. In addition, the system 10 is preferably used to provide engine torque data directly to vehicle sub-systems that rely upon such data for a feedback control system. It is appreciated that the system 10 in this configuration, provides a means for converting the sensor data to a calibrated torque value thus improving the accuracy of the estimation module, and enabling the autonomous and constant adjustment (i.e. optimization) of the various vehicle sub-systems and components, based on actual engine torque values. It is further appreciated that the module and direct sensory system will provide redundant means for determining engine torque data and thus increasing the quality and reliability of systems and subsystems using such information in their functions.

Preferred embodiments I) and II) of the system 10 are more particularly described below, with the understanding that said embodiments do not further limit the general inventive concept as previously described, but instead are species of the same:

I. Accurate Differential Time Measurement for Engine Torque Sensing

Figure 4:
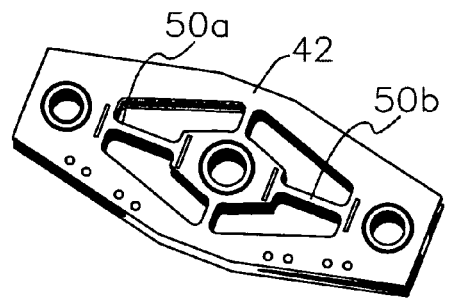
FIG. 4 is a perspective view of a preferred embodiment of the sensor plate shown in FIG. 3, particularly illustrating two expandable measurement bars.

In a first preferred embodiment, the sensor 26 may utilize accurate differential time measurement (ADTM) technology to measure the flexplate strain (said technology being further described in U.S. Pat. No. 6,621,278 to Ariav). In this configuration, a cyclically-repeating pulse is generated at one end of a sensor 26 having an expandable member and transmitted to the other end. The arrival time of the pulse is measured and compared to a reference value. The reference value is obtained under no engine torque application. Any change in the travel time of the pulse in the member is then attributed to the transmitted torque. As shown in FIG. 3 through 5, this highly precise method of determining the travel time of pulses in a bar under strain is adopted in the present invention for measuring engine torque.

In this configuration, the system 10 includes piezoelectric oscillators (i.e. signal generators) 36 that generate the pulse waves and are located at each end of the member. The signal generator 36 is operable to transmit the energy waves to the sensors 26, and may be integrated with the sensor 26 at the ends. The system 10 preferably includes a transceiver 38 intermediately coupled to the sensors 26 and receiver 28. The transceiver 38 is configured to receive the strain data from each sensor 26, and generate and transmit a strain signal to the receiver 28, based on the strain data received. In the illustrated embodiment the transceiver 38 is presented by a data collection and communication board 40 that is fixedly connected to the flexplate 18.

Each of the sensors 26 is fixedly connected to the flexplate 18 by a sensor plate 42 (see FIG. 4), two controller boards 44, and a plurality of relatively rigid fasteners 46, such as bolts, screws, rivets, or pins. The sensor plate 42 and controller boards 44 oppositely engage the front (i.e. engine-side) and back surfaces of the flexplate 18, so as to clamp the sensor 26 into position. Likewise, the data collection and communication board 40 is also clamped to the flexplate 18. Finally, an internal power supply board 48 is fixedly attached to the flexplate 18, and configured to supply the sensors 26 and communication board 40 with sufficient power. The preferred internal power supply produces its charge through inductive means, and as such is operable to supply power only when the flexplate 18 is rotating.

As previously mentioned, and shown in FIG. 4, the sensor plate 42 includes at least one expandable or deformable member that is caused to change by flexplate strain, and preferably, includes two expandable slender bars 50a,b. The bars 50a,b are configured to be readily expanded or contracted by the flexplate strain, and as such, present a suitable cross-sectional area, and modulus of elasticity. In this configuration, the sensor 26 is preferably circumferentially installed, so that the longitudinal axis of the bars 50a,b are perpendicular to the bisecting radius (see, FIG. 3). As previously mentioned, each bar is attached to a piezoelectric pulse generator 36 preferably at both ends, so that the sensor 26 is configured to generate an impulse signal at one end of each bar, propagate the signal towards the other end, measure the elapsed time of pulse propagation, and generate and transmit to the receiver 28 strain-related data based on the measured elapsed time. Variations in the elapsed time from a predetermined reference value is a measure of the change in the nominal length of the bar when subjected to the strain field. More preferably, the bars 50a,b may be further comprised of elastic material.

To improve cold-start driveability, the aforementioned flexplate mounted components of the system 10 are additionally powered by an external power supply 52 spaced from the flexplate 18. As shown in FIG. 5, the power supply 52 may be connected to the components through the slip ring 30, brushes 54, and wire feeds 56. More preferably, however, the external power supply 52 may be wirelessly coupled to the components, through suitable short range means, such as RF, infrared, or optical based technologies.

Finally, and as further shown in FIG. 5, a digital signal processor (Electronic Control Box—DSP unit) 58 is configured to communicate with the receiver 28. At the DSP unit 58, the strain-related signal is analyzed and converted to engine torque values, and then further communicated to relevant nodes within the communication network.

It is appreciated that the first preferred embodiment of the invention provides a method of measuring the elongations along a bar, results in a highly accurate (i.e. <1 Nm) strain measurement system, significantly reduces power consumption in comparison to conventional crankshaft sensors, and compensates for engine temperature effects.

II. Surface Acoustic Wave (SAW) Technique for Engine Torque Sensing

Figure 6:
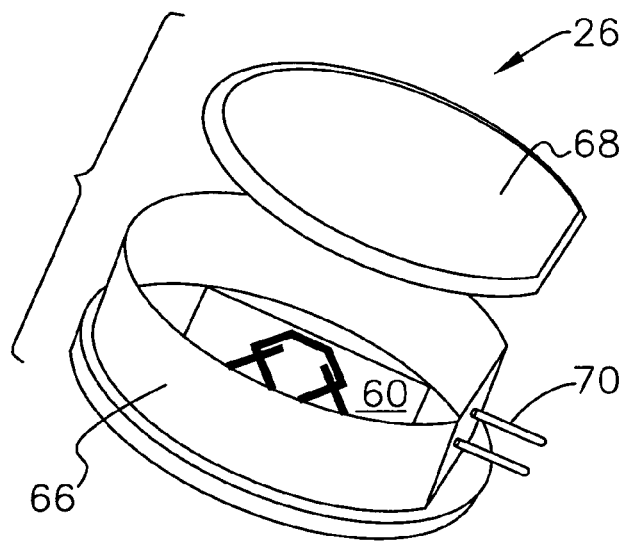
FIG. 6 is a perspective view of a SAW (surface acoustic wave)-based torque sensor in accordance with a second preferred embodiment of the present invention, particularly illustrating the interior of a capsule, a removable lid, a base, an array of metal strips, and an inter-digital transducer.
Figure 6A:
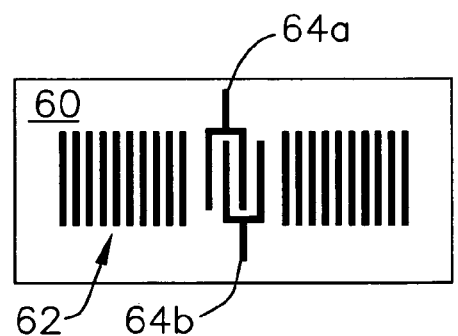
FIG. 6a is a plan view of a preferred embodiment of a base, array, and interleaved electrodes.

A second preferred embodiment of the present invention utilizes surface acoustic wave (SAW) technology to measure the strain in the flexplate 18 as is known in the prior art. In this configuration, the sensor 26 comprises a resonator made up of a micro-structure deposited on a piezoelectric substrate (i.e. crystal, or base) 60, is affixed to the flexplate 18. As shown in FIGS. 6 and 6a, the deposited structure, presents at least one reflector array 62 and at least one pair of interleaved comb-like electrodes 64a,b. For example, the array 62 may be formed by a plurality of approximately 1,000 metal strips at a 2 mm period. The array 62 and electrodes 64a,b generally consists of suitable conductive material, such as aluminum, and have a suitable thickness (e.g. 100 Angstroms). The electrodes 64a,b present finger widths corresponding to anticipated frequencies of operation, e.g. 900 MHz (1 μm)-100 MHz (8 μm). The substrate 60 is typically manufactured from ceramic, quartz or other suitable piezoelectric material. Finally, the preferred sensor 26, as shown in FIG. 6, includes a capsule 66 configured to house the substrate 60, array 62, and electrodes 64a,b. The capsule 66 preferably includes a removable outer lid 68, so as to enable access to the interior of the sensor 26. The sensor 26 further includes two antennas/testing prongs 70 for delivering the impulse signal to and from the electrodes 64a,b, and for testing the sensor 26.

It is appreciated by those ordinarily skilled in the art that the application of an electric pulse signal to one electrode 64a causes the sensor 26, in this configuration, to act as a transducer, wherein the electric input signal is converted to an acoustic wave. The wave is transmitted through the array 62, substrate 60, and to the other electrode 64b, where the process is reversed and an electric output signal is generated. The output signal has a characteristic resonant frequency which is dependent in part upon the strain field acting upon the substrate 60, as well as the geometry of the array 62, including the spacing between the interleaved electrodes 64a,b. That is to say, as the sensor 26 undergoes strain the resonant frequency modifies in relationship to the strain, thereby enabling the strain to be accurately measured by identifying the change in resonant (or natural) frequency relative to a reference value.

In this configuration, an interrogation pulse wave generator 72 and the receiver 28 are spaced from the rotating flexplate 18 and preferably fixedly attached to a stationary part of vehicle 12. More preferably, the wave generator 72 and receiver 28 are fixedly attached to a mounting bracket 74 configured to proximally secure the wave generator 72 and receiver 28 to the vehicle 12 near the sensor 26. The mounting bracket 74 is therefore preferably configured to attach to the vehicle 12 near the flexplate 18, but at a sufficient distance so as not to interfere with its rotation. For example, the bracket 74 may be adapted for interconnection with the engine oil seal 20 in conventional internal combustion engine applications, as shown in FIG. 7.

Figure 6B:
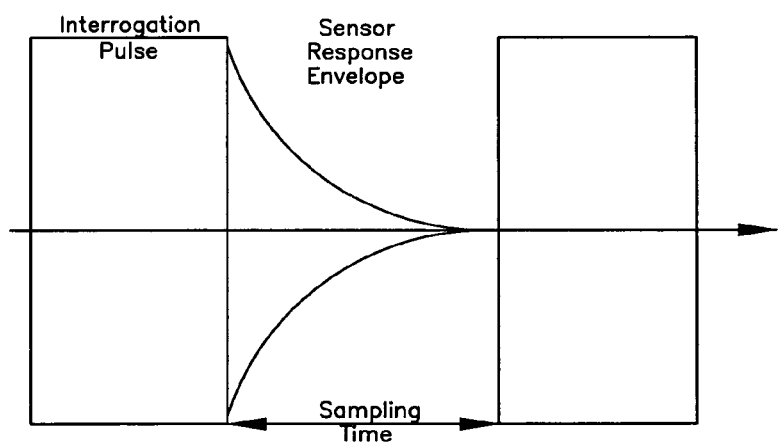
FIG. 6b is a schematic diagram of SAW-based sensor operation, particularly representing an interrogation pulse, sensor response, and sampling time.

The interrogation pulse wave generator 72 is configured to periodically transmit impulse signals to the sensor 26. The interrogation pulse signal (see FIG. 6b) preferably presents sufficient power (e.g. 1 mW) to produce a measurable return signal from the sensor 26, and is, therefore, preferably used for both signal and power transmission. The return signal is then wirelessly transmitted to the receiver 28 for further processing in the associated electronic box 76 to determine the strain. As shown in FIG. 7, the receiver 28 preferably presents a circular configuration, such as a ring of copper, and is located opposite the sensor 26 relative to the mounting bracket 74. It is appreciated that the circular configuration of the receiver enables a minimum distance to be maintained between the receiver 28 and sensor 26 during flexplate rotation.

Figure 8:
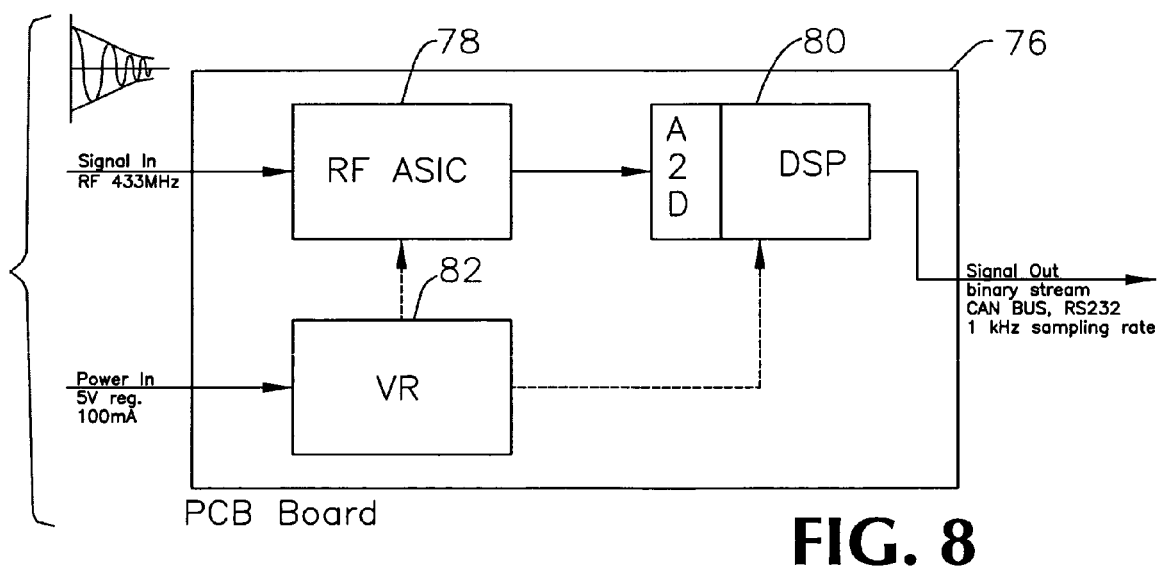
FIG. 8 is an electronics control box schematic diagram of a preferred embodiment of a processor usable with the SAW-based flexplate torque sensor.

More particularly, as shown in FIGS. 7 and 8, the receiver 28 is further connected to a processor 76 that is configured to analyze and extract the natural frequencies from the return signal at each sampling time and compare the resultant signal to a reference value. The preferred processor 76 includes a reader unit 78, an analogue to digital converter/digital signal processor (A2D DSP) 80, and a voltage regulator 82. As shown in FIG. 8, the reader unit 78 may be an RF ASIC configured to receive an RF 433 MHz analogue return signal, regulate the signal, extract the natural frequencies, and transmit the result to the A2D DSP 80. The A2D DSP 80 is configured to convert the resultant signal to digital format, utilize advanced algorithms to interrogate the strain field, and transmit the engine torque data to the in-vehicle communication network at a preferably 1 kHz or greater sampling rate. The data can be transmitted to the engine/transmission control modules using RS232, CAN Bus or Flexray communication protocols. The regulator 82 regulates the operating voltage at both components.

Figure 9:
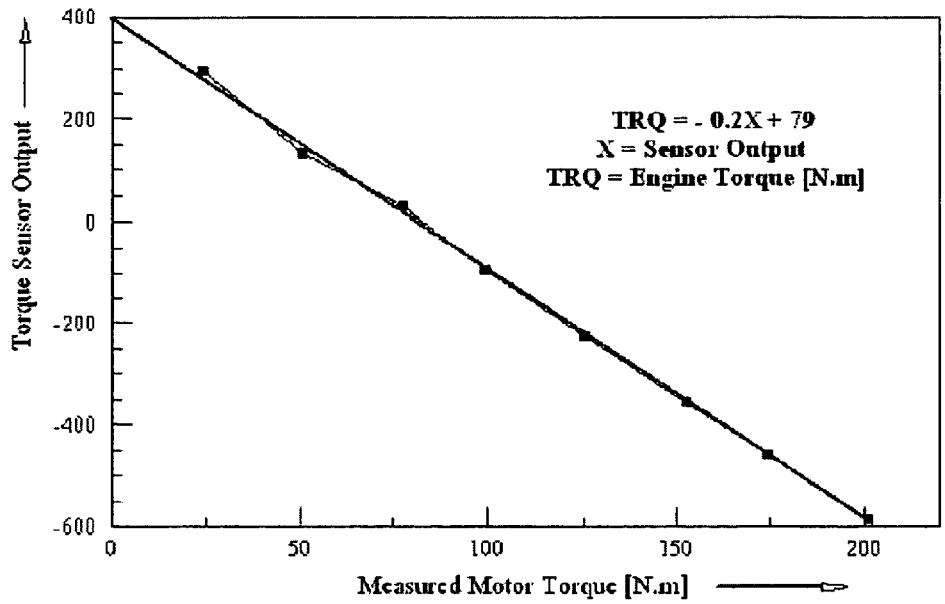
FIG. 9 is a line graph of an exemplary sample of Torque Sensor Output versus Measured Motor Torque values collected by a SAW-based flexplate torque sensor, particularly illustrating a linear relationship therebetween.

In this configuration, the processor 76 functions to digitally convert the senor output readings to a stream of digital values (e.g. in counts). Through correlations established between the digitized signal output and the actual torque measured on an engine dynamometer equipped with a precise laboratory torque sensor, a relationship between the digitized sensor output and real engine torque is developed. For example, one set of sample sensor readings (X) taken at 1000 rpm and 35 degrees Celsius, and resultant engine torque values (TRQ) produced the line graph shown in FIG. 9, wherein:

$TRQ=aX+b$, a=−0.2, and b=79 in this specific experimental realization.

Figure 10:
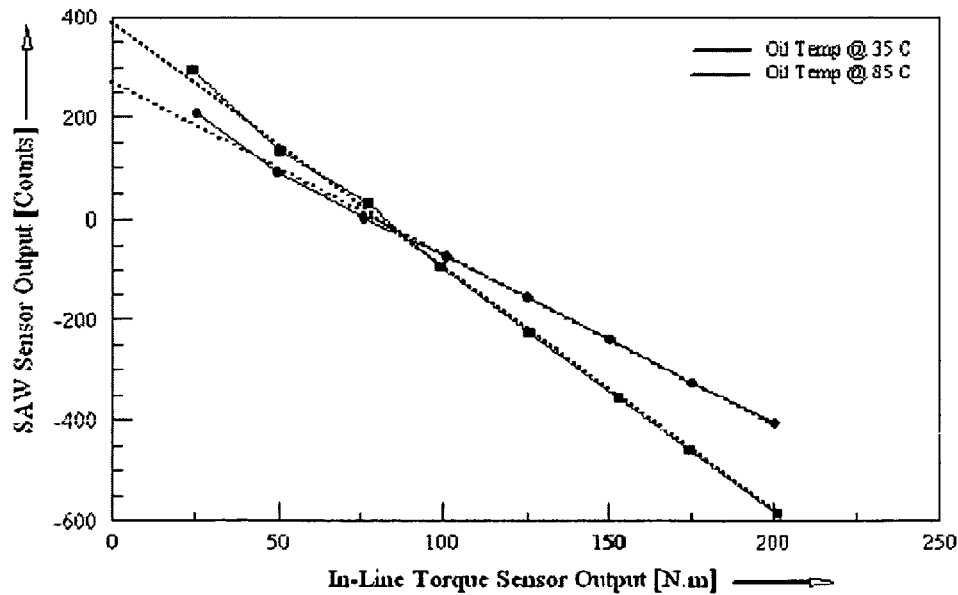
FIG. 10 is a line graph of a plurality of samples of the relationship shown in FIG. 9, wherein each line represents a sample taken at a different temperature, so as to illustrate the relationship between temperature and the relationship shown in FIG. 9.

Samples taken at various temperatures show the general temperature dependence of the readings (X). For example, as shown in FIG. 10, sample readings taken at 85 degrees Celsius resulted in a relatively flatter line graph in comparison to the 35-degree sample. As such, in this configuration, the preferred system 10 further includes a temperature sensor (not shown), and the A2D DSP is further configured to compensate the torque value according to the temperature reading taken from the temperature sensor.

In addition to the other advantages of a flexplate-mounted sensor, it is appreciated that the second preferred embodiment provides a relatively low estimated cost of production, a stand-alone flexplate-mounted sensor that needs no separate power supply, the accuracy of direct engine torque measurement, and the packaging facilitation of wireless signal transmission.

The preferred forms of the invention described above are to be used as illustration only, and should not be utilized in a limiting sense in interpreting the scope of the general inventive concept, i.e. a flexplate-mounted engine torque sensor. Obvious modifications to the exemplary embodiments and methods of operation, as set forth herein, could be readily made by those skilled in the art without departing from the spirit of the present invention. The inventor hereby states his intent to rely on the Doctrine of Equivalents to determine and assess the reasonably fair scope of the present invention as pertains to any system or method not materially departing from but outside the literal scope of the invention as set forth in the following claims.

What is claimed is:

1. An engine torque sensory system adapted for use with a vehicle having an engine and a flexplate, wherein the flexplate is coupled to, rotated by, and exhibits deformation caused by torque generated by the engine, said system comprising:
 a plurality of radially symmetric deformation sensors directly attached to the surface of the flexplate; and
 a receiver fixedly attached to the vehicle, spaced from the flexplate, and communicatively coupled to the sensors,
 said sensors each being caused to change by and relative to the deformation exhibited on the surface of the flexplate, so as to measure the deformation, and configured to generate and transmit deformation data to the receiver,
 said receiver being configured to receive the deformation data, determine an aggregate measurement based on the deformation data received from each sensor, and cause the data to be converted into correlative engine torque values.

2. The system as claimed in claim 1, said sensors utilizing an optical, piezoelectric, magnetoelastic, or resistance based technology to measure the deformation.

3. The system as claimed in claim 1, said deformation being strain,
 said sensors including a strain gauge fixedly attached to the flexplate.

4. The system as claimed in claim 1,
 said vehicle including an engine torque estimation module,
 said receiver being communicatively coupled to the module, so as to provide feedback to the module,
 said module being autonomously adjustable based on the feedback.

5. The system as claimed in claim 1, wherein said sensors are attached to the flexplate at predetermined optimal stress points.

6. The system as claimed in claim 1, wherein a plurality of sensors are co-radially aligned, so as to measure the deformation at multiple points along a given radius.

7. The system as claimed in claim 1; and
 a transceiver intermediately coupled to the sensors and receiver;
 said transceiver being configured to receive the deformation data from the sensors, and generate and transmit a signal to the receiver, based on the deformation data.

8. The system as claimed in claim 7
 said sensors and transceiver being inductively powered by the rotation of the flexplate.

9. An engine torque sensory system adapted for use with a vehicle having an engine and a flexplate, wherein the flexplate is coupled to, rotated by, and exhibits strain caused by a torque generated by the engine, said system comprising:
 at least one strain sensor directly attached to the flexplate;
 a signal generator configured to deliver an impulse signal to said at least one sensor; and
 a receiver fixedly attached to the vehicle, spaced from the flexplate, and communicatively coupled to the sensor,
 said at least one sensor including a piezoelectric base attached to the flexplate, and an inter-digital transducer and array of metal strips attached to the base,
 said base, array, and transducer being caused to change by and correlative to the flexplate strain,
 said base, array, and transducer being cooperatively configured to receive, modify, and reflect the impulse signal to the receiver, said receiver being configured to determine an engine torque value based on the reflected signal.

10. The system as claimed in claim 9, wherein the signal generator is configured to transmit both the impulse signal and power to said at least one sensor.

11. The system as claimed in claim 9,
said sensor including a housing capsule, and at least one testing prong accessible from the exterior of the capsule,
said capsule and flexplate being cooperatively configured to at least substantially enclose the base, transducer, and array.

12. The system as claimed in claim 9,
said receiver including a processor configured to extract natural frequencies from the reflected signal, so as to determine the actual sensor signal, convert the sensor signal into a digital signal, and compare the digital signal to a reference value.

13. The system as claimed in claim 9; and
a mounting bracket fixedly attached to the vehicle and spaced from the flexplate,
said signal generator and receiver being fixedly attached to the bracket,
said vehicle further including a crankshaft,
said bracket being concentrically aligned with the crankshaft.

14. The system as claimed in system 9,
said receiver presenting a circular ring concentrically aligned with the crankshaft,
said ring and receiver being cooperatively configured, so as to maintain a minimum distance between the sensor and receiver during rotation.

15. An engine torque sensory system adapted for use with a vehicle having an engine and a flexplate, wherein the flexplate is coupled to, rotated by, and exhibits strain caused by torque generated by the engine, said system comprising:
at least one strain sensor directly attached to the flexplate;
a pulse generator configured to deliver an impulse signal to said at least one sensor; and
a receiver fixedly attached to the vehicle, spaced from the flexplate, and communicatively coupled to the sensor,
said at least one sensor including at least one measurement bar having first and second ends and presenting a predetermined cross-sectional area and modulus of elasticity, so as to be correlatively expandable by the flexplate strain,
said at least one sensor being configured to receive the impulse signal at the first bar end, propagate the signal towards the second end, measure an elapsed time of propagation, and generate and transmit to the receiver strain-related data based on the elapsed time,
said receiver being configured to receive the strain-related data, and convert the data into correlative engine torque values.

16. The system as claimed in claim 15, wherein a plurality of sensors are attached to the flexplate, an internal power supply board is attached to the flexplate and communicatively coupled to the sensors, and the internal power supply board is configured to supply power to each sensor, when the flexplate is rotated.

17. The system as claimed in claim 16,
said sensors and internal power supply board being further connected to an external power source through a slip ring rotatably coupled to the flexplate, so as to supply power to the sensors and generator, when the flexplate is not rotated.

18. The system as claimed in claim 16,
said sensors and internal power supply board being wirelessly coupled to an external power source, so as to supply power to the sensors and generator, when the flexplate is not rotated.

* * * * *